Figure 1:
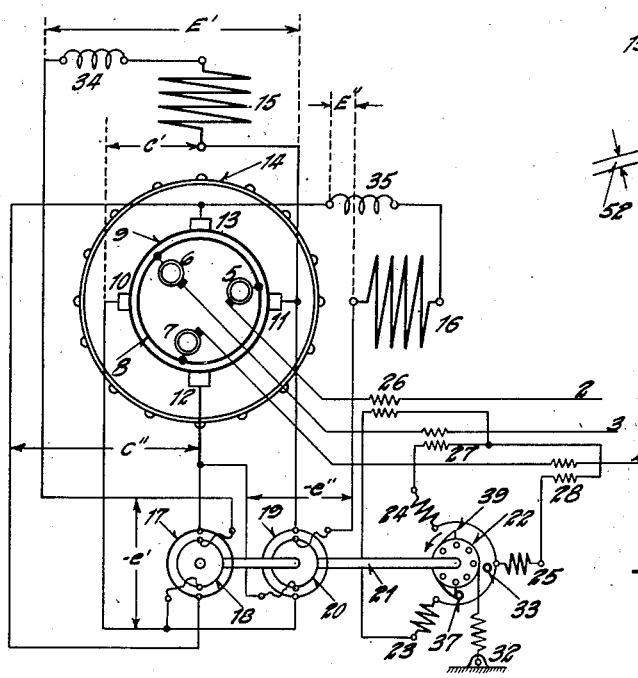

Oct. 26, 1926.
V. A. FYNN
1,604,900

NONSYNCHRONOUS PHASE COMPENSATED MOTOR

Filed Dec. 17, 1924    2 Sheets-Sheet 1

Inventor.
VALÈRE, ALFRED FYNN.
By John N. [illegible]
Attorney.

Oct. 26, 1926.

V. A. FYNN 1,604,900

NONSYNCHRONOUS PHASE COMPENSATED MOTOR

Filed Dec. 17, 1924   2 Sheets-Sheet 2

Inventor.
VALÈRE, ALFRED FYNN.
Attorney.

Patented Oct. 26, 1926.

1,604,900

UNITED STATES PATENT OFFICE.

VALÈRE ALFRED FYNN, OF ST. LOUIS, MISSOURI.

NONSYNCHRONOUS PHASE COMPENSATED MOTOR.

Application filed December 17, 1924. Serial No. 756,527.

My invention relates to polyphase nonsynchronous induction motors and generators and particularly to improved means for controlling the power factor or the phase compensation of such machines and to a system of distribution embodying such compensated machines. Some of the features of my invention are applicable to all types and forms of non-synchronous induction motors, while other features thereof are particularly applicable to machines in which the phase compensation producing or exciting voltages are of slip frequency and are generated in the motor itself.
Generally speaking, my invention consists in providing means whereby the secondary circuits carrying the exciting currents responsible for at least a part of the synchronously revolving fundamental magnetization in phase compensated polyphase induction motors are partly or entirely freed from load currents. I may so arrange matters that the exciting circuits carry but a fraction of the total load ampereturns at all loads, or that they carry a fraction of the total load ampereturns at some load and practically no load ampereturns at one or more other loads, or that they carry practically no load ampereturns at any load from no load to maximum load. I first provide two sets of windings on the secondary member, closing one of these preferably along a plurality of axes per pole pair and injecting into the other auxiliary and, in this case, exciting voltages along a plurality of axes per pole pair. This arrangement leads to a distribution of the total load ampereturns between the two sets of secondary windings because what may be referred to as working voltages will be induced or generated in each of these secondaries. These windings will be referred to as secondary "working" and "exciting" windings. Because the exciting winding upon which the auxiliary voltages are impressed also includes the source of said voltages, the impedance of its circuits will generally exceed that of the working winding and it may for that reason carry less of the induced or generated load currents. The less load currents the exciting circuits carry, the smaller can be their copper cross section, the smaller the capacity of the source of the auxiliary voltages and the easier is the commutation of the currents flowing through the exciting circuits in case a commutator is included in said circuits. To reduce the load currents in the exciting circuits, I prefer to make the inductive relation between the secondary working winding and the primary better than the inductive relation between the exciting winding and said primary, for instance by locating the working winding between the exciting winding and the primary. I may further increase the impedance of the secondary exciting winding by means of impedances located outside of the motor or in other ways. In such manner I can make the impedance of the secondary exciting winding per working volt induced or generated in said winding greater than the impedance of the secondary working winding per working volt induced or generated in said working winding by the fundamental magnetization of the machine and yet force through the exciting winding as many exciting ampereturns as desired because I produce these by means of auxiliary voltages conductively impressed on the exciting winding and not generated therein and whose magnitude I can adjust without changing the magnitude of the fundamental magnetization of the motor. I, however, realize that too great an increase of the impedance of the exciting circuit, particularly when secured to a great extent by increasing the ohmic resistance of the circuit, may in some cases lower the efficiency of the machine unduly and I therefore do not always entirely rely on this feature. Whether or not I provide two sets of secondary windings with different impedances per generated volt, I may impress on the exciting windings auxiliary voltages of such phase and magnitude that one component of each of said voltages will produce at least part of the synchronously revolving fundamental magnetization of the machine, while the other component of each of these voltages, displaced by 90 degrees from the first, will oppose what may be termed the working voltages appearing in the exciting windings and induced or generated therein by the synchronously revolving fundamental magnetization. These working voltages, if not opposed, will produce working currents in the circuits of the exciting winding; they increase as the slip and the load of the motor increase and if they are to be neutralized at all loads, those components of the auxiliary voltages which oppose the generated or induced working voltages must increase in like manner. On the other hand, the excitation of polyphase induction motors must and does remain practically constant at all loads, and if a constant power factor is desired, that component of each auxiliary voltage which contributes to or determines the excitation of the motor and lags by 90 degrees with respect to the working-current-opposing component should remain constant. If this component varies, the power factor of the machine will vary. Because of these conditions the results as to power factor and load currents in the exciting windings will vary according to the manner in which the phase and magnitude of the auxiliary voltages are selected and according to the manner in which the phase or the magnitude or both are varied in case they are changed at all. It is, however, possible to so arrange matters as to always exclude practically all load currents from the exciting windings and cause the power factor to remain constant or to vary with load in almost any desired manner.

The objects and features of this invention will more clearly appear from the detailed description taken in connection with the accompanying drawings and will be pointed out in the claims.

Figure 3:
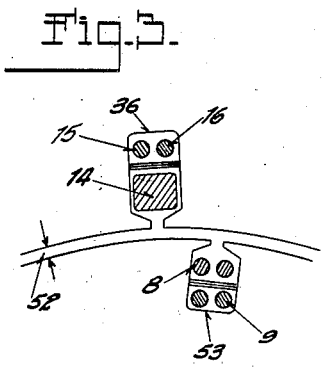
Figure 2:
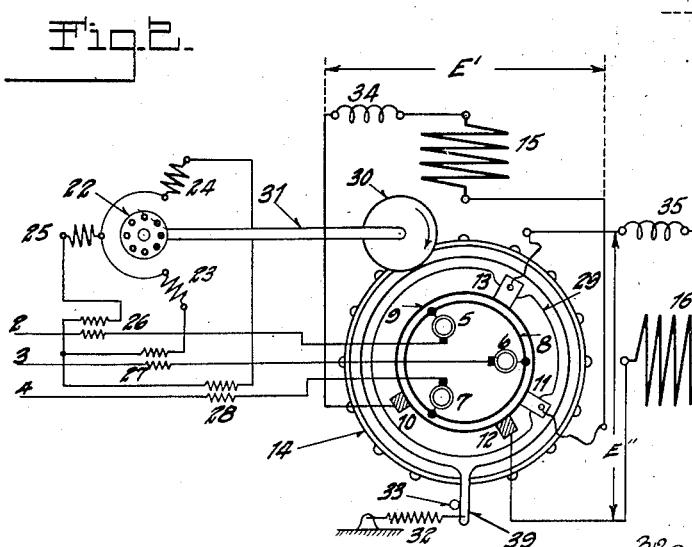
Figure 7:
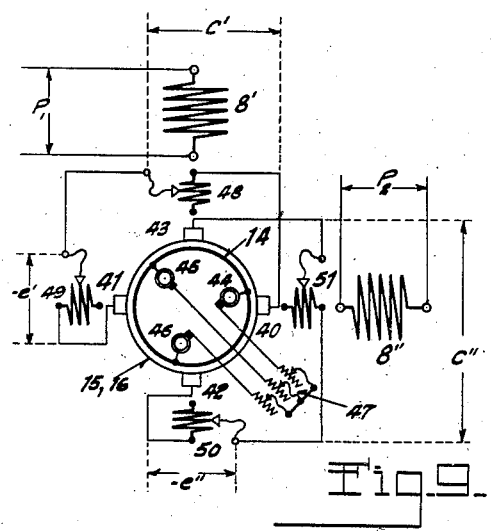
Figure 9:
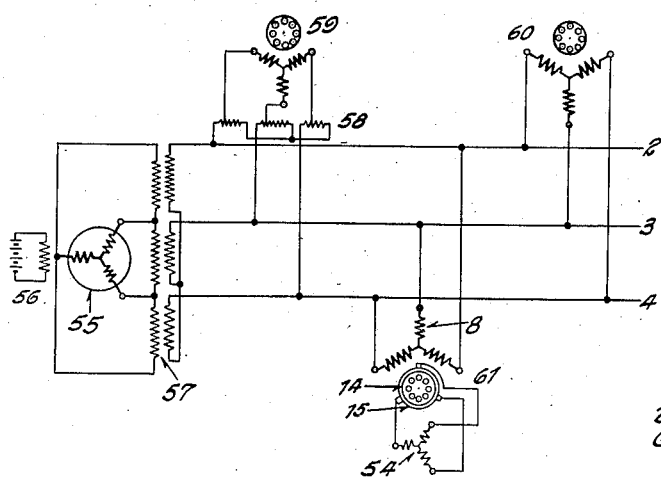

In the accompanying diagrammatic drawings, Figs. 1, 2 and 7 show two-pole embodiments of my invention, Fig. 3, 4, 5, 6, 8 are explanatory diagrams and Fig. 9 is a system of distribution embodying my invention.

Referring to Fig. 1, this illustrates a three-phase asynchronous induction motor, the primary of which is located on the revolving member. The primary carries a three-phase winding 8 provided with slip-rings 5, 6, 7 connected to the three-phase supply 2, 3, 4 by means of brushes and with the interposition of the primaries of the series transformers 26, 27, 28. The primary winding 8 is preferably located near the top of the rotor slots 53, close to the outer periphery of the rotor, as clearly shown in Fig. 3 where 53 is a rotor slot, 36 a stator slot and 52 the air-gap between rotor and stator. The primary also carries a commuted winding 9 located in the bottom of the rotor slots 53. The sets of brushes 10, 11 and 12, 13 displaced by 90 electrical degrees co-operate with the commuted winding. These brushes are shown as resting directly on the commuted winding 9. In practice a commutator would be used, but it is not shown in order to simplify the drawing and also to avoid all indefiniteness as to the location of the brushes with relation to the winding 9. The secondary of this motor, here the stator, carries a squirrel cage winding 14 or any other winding which can be closed along a plurality of axes per pole pair. The stator also carries the two windings 15 and 16 displaced by 90 electrical degrees. The squirrel cage winding or its equivalent is preferably located close to the inner periphery of the stator slot 36 so as to be in the closest possible inductive relation to the primary winding 8, while the windings 15 and 16 are preferably placed in the bottom of the stator slots and away from the inner periphery as shown in Fig. 3. The ohmic resistance of 14 is preferably made lower per volt generated than that of 15, 16. The brushes 10, 11 stand in the axis of the winding 16, the brushes 12, 13 in that of the winding 15. The brushes 10, 11 are connected in circuit with the winding 15, the impedance 34 and with the movable secondary 18 of the adjustable ratio transformer 17, 18. The primary 17 of this transformer is connected to the brushes 12, 13. Similarly, the brushes 12, 13 are connected in circuit with the impedance 35, the secondary winding 16 and the movable secondary 20 of the adjustable ratio transformer 19, 20. The primary 19 of this transformer is connected to the brushes 10, 11. The two secondaries 18 and 20 of the adjustable ratio transformers are mounted on the shaft 21, together with the squirrel cage armature 22 of the motor relay 22, 23, 24, 25. The polyphase windings 23, 24, 25 on the stator of the relay are star connected and connected to the star connected secondaries of the series transformers 26, 27, 28. At no load the rotor 22 of the relay is under the control of the spring 32, which holds it in the position determined by the stop 33 and by one of the projections 39 carried by the rotor 22, in which position the axes of the secondaries 18 and 20 of the adjustable ratio transformers are at right angles to the axes of the corresponding primaries 17, 19 and the secondary voltages are zero. The connections between the windings 23, 24, 25 of the relay and the series transformers 26, 27, 28 are so made that the torque exerted by the rotor 22 tends to move the latter counterclockwise and these windings and transformers are so dimensioned that when the motor is yielding its maximum output, the rotor 22 of the relay and the secondaries 18 and 20 of the adjustable ratio transformers are in the position shown in Fig. 1. In this position the secondary voltage of the adjustable ratio transformers is at a maximum. The brushes 10, 11 and 12, 13 are located to supply to the windings 15, 16 respectively exciting voltages $c'$ and $c''$ of such phase and periodicity as are necessary to produce at least part of the synchronously revolving fundamental motor magnetization from the secondary. The secondaries 18 and 20 of the adjustable ratio transformers are so connected as to supply to each of the secondary windings 15 and 16 a voltage (−e) of a phase opposed to the phase of the working voltage e induced or generated in each of these windings. The vectorial sum of the voltage at the brushes 10, 11 and of the secondary voltage of the transformer 17, 18 is the auxiliary voltage E' for the phase 15 of the secondary exciting winding 15, 16. The auxiliary voltage E'' for the phase 16 is the vectorial sum of the voltage at the brushes 12, 13 and of the secondary voltage of the transformer 19, 20. The impedances 34, 35 may be external impedances or may be taken as a diagrammatic representation of some such arrangement as indicated in Fig. 3 whereby the impedance of 15, 16 per volt of working voltage generated in the windings 15, 16 is greater than the impedance of 14 per working volt generated in the winding 14.

Figure 6:
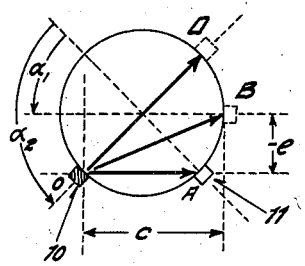

Referring to Fig. 2, the revolving member carries the primary winding 8 adapted to be connected to the three-phase supply 2, 3, 4 by means of the sliprings 5, 6, 7 and brushes cooperating therewith and through the primaries of the series transformers 26, 27, 28. The rotor also carries a commuted winding 9 with which co-operate the brushes 10, 11 and 12, 13. The brushes 10 and 12 are stationary, but the brushes 11 and 13 are mounted on the movable rocker arm 29 normally under the control of the spring 32 which holds a suitable projection 39 of said rocker arm against the stop 33 and thus locates the brushes in the position shown. The brush rocker arm 29 is geared to the shaft 31 of the armature 22 of the motor relay 22, 23, 24, 25 by means of the gear wheel 30, and the star connected stator windings 23, 24, 25 of said relays are connected to the star connected secondaries of the series transformers 26, 27, 28 so as to cause the rotor 22 to exert a clockwise torque which tends to move the brush rocker arm counterclockwise and away from the stop 33. The stator of this motor, here the secondary, carries a squirrel cage winding 14 or its equivalent and the two windings 15, 16 displaced by 90 electrical degrees. The winding 15 is connected to the brushes 10, 11 through the impedance 34. The winding 16 is connected to the brushes 12, 13 through the impedance 35. When the brush rocker arm 29 is under the control of spring 32 and held in the position shown in Fig. 2, the axis of the brushes 10, 11 coincides with that of 16 and the axis of the brushes 12, 13 with that of 15. The connections are so made that the phase of the auxiliary voltage E' supplied by the brushes 10, 11 when in the position shown and the phase of the auxiliary voltage E'' simultaneously supplied by the brushes 12, 13 are as required for the excitation of the machine with the help of the secondary windings 15 and 16, each leads the working voltage in the circuit on which it is impressed by about 90 degrees. The brushes are held in the position shown in Fig. 2 at no load. As the load increases the brush rocker arm 29 is moved counterclockwise. This changes the phase and magnitude of the voltages delivered by the brushes 10, 11 and 12, 13 as indicated in Fig. 6, and each of these auxiliary voltages now supplies a working-voltage-opposing component (−e) as well as an exciting voltage component c to the secondary winding with which it co-operates.

Figure 8:
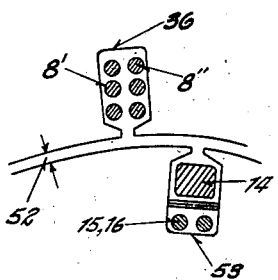

In Fig. 7 the primary is on the stator and shown as a two-phase winding 8' and 8'' connected to the two-phase supply $P_1$ $P_2$. The rotor carries a three-phase working winding 14 adapted to be closed over the adjustable resistances 47 by way of the sliprings 44, 45, 46 and co-operating brushes and a commuted exciting winding 15, 16 with which co-operates the two-phase arrangement of brushes 40, 41 and 42, 43. The brushes 40, 41 stand in the axis of the primary 8'' and the brushes 42, 43 in that of the primary 8'. The auxiliary voltages are derived from the stator windings 48, 49, 50 and 51. The active number of turns of these auxiliary windings can be varied as indicated in Fig. 7, thus varying the magnitude of the voltages derived therefrom. Windings 48 and 49 are connected in series with the brushes 40, 41, winding 48 supplying the exciting component c' and winding 49 the working-voltage-opposing component (−e'). Similarly, the windings 50 and 51 are connected in series with the brushes 42, 43, winding 51 supplying the exciting component c'' and winding 50 the working-voltage-opposing component (−e''). The preferred relative location of the principal windings is shown in Fig. 8. In the rotor slots 53 the working winding 14 is located near the air-gap 52 separating rotor and stator and at the top of the rotor slots. The exciting winding 15, 16 is located away from the air-gap in the bottom of the rotor slots. The primary winding 8', 8'' is located in the stator slots 36 and preferably close to the air-gap 52. If windings such as 48, 49, 50, 51 are used they can be located in the bottom or at the top of the stator slots 36 but preferably in the bottom of said slots and away from the air-gap 52. Some of the objects of this disposition of the windings are to make the inductive relation between the working winding 14 and the primary inducing winding 8', 8'' better than the inductive relation between 8', 8'' and the exciting winding 15, 16 and to increase the impedance of the latter.

In order to secure good commutation it will be usually necessary to keep the brush voltages well below the line voltages and for this reason it will often be more convenient to keep separate the windings 8 and 9 on the primary of Figs. 1 and 2 and to apply less than line voltage to the commutator brushes of Fig. 7. There is, however, no theoretical reason why the windings 8 and 9 should not be combined and there are several known ways of suitably combining such windings. While it will mostly be convenient to use a squirrel cage as the working winding on the secondary, yet this is by no means necessary and any kind of a winding which can be closed along at least one, but preferably along several axes per pole pair and either closed directly or over adjustable resistances can be used as shown in Fig. 7. The exciting windings 15, 16 can be of any desired polyphase type and can be distributed to a greater or to a less degree over the surface of each pole. While for the sake of greater simplicity and clearness the secondary exciting set of windings 15, 16 and the cooperating polyphase arrangement of brushes have been shown of the two-phase type in Figs. 1, 2 and 7, there is, of course, no reason whatsoever why a three-phase exciting secondary and a cooperating three-phase arrangement of brushes should not be used, nor is the arrangement limited to a two or a three-phase disposition of windings and brushes and the choice of the number of phases of the exciting circuit is quite independent of the number of phases for which the primary winding 8 is wound. While the adjustable ratio transformers 17, 18 and 19, 20 have been shown with a movable secondary, yet it will undoubtedly be understood that they can be replaced by adjustable ratio transformers in which the number of primary or secondary turns can be varied instead of displacing the axis of the secondary relatively to that of the primary. The air-gap necessary in the type of adjustable transformers shown increases the impedance of each of the secondary exciting circuits.

Turning now to the mode of operation and first referring to Fig. 1, the motor may be started like an ordinary asynchronous induction machine by connecting the sliprings 5, 6, 7 to the full line voltage or a fraction thereof, whereupon the co-operation of the synchronously revolving fundamental magnetization produced by the polyphase currents fed into the rotor with the squirrel cage 14 on the secondary will bring the machine to a nearly synchronous speed. During this starting operation, the brush circuits may be interrupted or not as desired and the series transformers 26, 27, 28 may be left in circuit, in which case the rotor 22 of the relay will be held in the position shown in the figure until the line currents have been reduced sufficiently to permit of this rotor to turn back to its no-load position, in which one of the projections 39 rests against the stop 33. When the machine runs idle, its speed will be slightly subsynchronous. In an induction motor in which the primary revolves, it rotates in a direction opposed to that in which the fundamental magnetization revolves. The speed of the latter is always synchronous with respect to the primary. When the primary is at rest the fundamental magnetization revolves synchronously with respect to the stator; as the speed of the primary increases, so does the speed of the fundamental magnetization decrease with respect to the stator, becoming zero when the primary revolves synchronously. At slightly sub-synchronous speeds, the fundamental magnetization revolves very slowly with respect to the stator and induces or generates in the stator or secondary windings working voltages $e$ which are responsible for the working currents. These working currents co-act with the fundamental magnetization of the machine to produce the working torque. Because of the very low slip frequencies within the usual operating limits, the working currents are practically in phase with the working voltages. In Fig. 1 there are two sets of polyaxially closed secondary windings on the stator and working voltages will be generated in each. Since the impedance of the two-phase exciting winding 15, 16 on the secondary, per working volt generated in said exciting winding, is, according to this invention, made greater than the impedance of the working winding 14 on the secondary, per working volt generated in the working winding, the latter would carry the greater part of the total induced or generated secondary working ampereturns even if no auxiliary voltages are introduced into the exciting winding. When auxiliary exciting voltages are injected into the windings 15, 16 the working ampereturns in said windings are further reduced and sometimes almost entirely eliminated and when the auxiliary voltages have working-voltage-opposing as well as exciting components then the working ampereturns in 15, 16 are still further diminished and can always be entirely eliminated.

Figure 4:
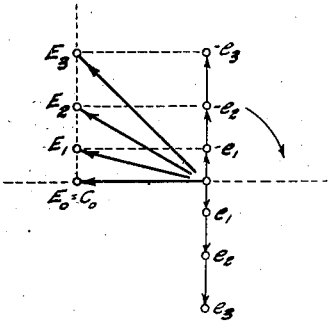

The two-phase secondary 15, 16 is connected to the two-phase arrangement of brushes 10, 11 and 12, 13 for the purpose of producing the fundamental magnetization of the motor from the secondary instead of the primary and in circuits which carry slip frequency currents instead of in circuits which carry line frequency currents. In view of the fact that at normal slip frequencies there is practically no phase difference between voltage and current, it is necessary in order to produce the fundamental magnetization of the motor from the secondary to introduce into each exciting-stator winding an exciting voltage $c$ which leads the working voltage $e$ in that winding by about 90 degrees. The voltage $e$ generated in each of the windings 15, 16 depends for its magnitude and phase on the magnitude of the fundamental magnetization, on its speed relatively to said windings and on the position of its axis relatively to the axis of each of these windings. When the fundamental magnetization coincides with the axis of 15, the working voltage in that winding is zero while that in the winding 16 is at a maximum. The amplitude of any brush voltage depends on the magnitude of the fundamental magnetization and on the speed of the latter relatively to the conductors of the winding 9. The magnitude of this magnetization is practically constant in normal operation and its speed relatively to 9 is always synchronous and therefore constant, with the result that the amplitude of the brush voltages is practically constant in normal operation. The periodicity of said voltages is of slip frequency and therefore the same as that of the voltages generated in 15 and 16. Their phase is determined by the relative position of the axis of the fundamental magnetization and the axis of the brushes considered. Thus when the axis of the fundamental magnetization coincides with the axis of the secondary winding 15, the voltage at the brushes 12, 13 is zero and that at the brushes 10, 11 is a maximum and therefore in phase quadrature with the voltage generated in 15. For this reason the brushes 10, 11 are connected to the secondary 15 and the brushes 12, 13 to the secondary 16. This arrangement conduces through these secondaries exciting currents of the proper phase and direction to produce at least a part of the fundamental motor magnetization normally produced by the three-phase primary 8. The exciting currents in the several phases of the secondary 15, 16, will be maintained independently of any currents which may flow through said circuits because of voltages $e$ induced or generated in the winding 15, 16 by the fundamental magnetization of the motor, whether produced from the primary or the secondary. Such other currents will simply be superposed on the exciting currents and will increase the load on the brushes, on the commutator, on the primary winding 9 and on the secondary windings 15, 16, not only necessitating an increase in the size of these elements but increasing the commutating difficulties. In Fig. 1 the adjustable ratio transformers 17, 18 and 19, 20 introduce into the circuit of the windings 15, 16 voltages $(-e)$ which are of opposite direction to the working voltages $e$ in said circuits and therefore in phase quadrature with the exciting voltages $c$ impressed on said circuits by the polyphase arrangement of brushes. To this end the primary 17 of the transformer 17, 18 is connected to the brushes 12, 13, and the primary 19 of the transformer 19, 20 is connected to the brushes 10, 11. Since the working voltages $e$ induced in the windings 15, 16 increase with increasing load, the working-voltage-opposing voltages $(-e)$ derived from the transformers 17, 18 and 19, 20 should increase likewise. This is automatically accomplished in Fig. 1 by means of the relay 22, 23, 24, 25, the primary of which is so connected to the series transformers 26, 27, 28 as to cause its rotor or secondary 22 to move counterclockwise with increasing load. At no load one of the projections 39 on the rotor 22 rests against the stop 33 and the axis of the movable secondary winding 20 of the transformer 19, 20 is practically at right angles to the axis of the primary 19, with the result that the secondary voltage $(-e'')$ of that transformer delivered to the circuit including the winding 16 is practically zero. At maximum motor load the movement of the relay rotor 22 places the axis of the secondary 20 in coincidence with the axis of the primary 19 and the voltage $(-e'')$ opposing the working voltage $e''$ in the circuit of the winding 16 is at a maximum. The relay performs the same duty for phase 15 of the two-phase secondary exciting winding. The working voltage $e$ in any phase of either set of windings on the secondary or the resultant voltage in the collective phases of any secondary winding increases with increasing load and slip as shown by the vectors $e_1$, $e_2$, $e_3$ of Fig. 4. Disregarding any small phase differences which may be introduced or caused by secondary causes, for instance by the fact that every secondary has a certain amount of reactance even at small slips, that component of the auxiliary voltage E which is to produce at least a part of the fundamental magnetization of the machine from the secondary should lead the working voltage by 90 degrees as shown in Fig. 4. At no load the auxiliary voltage $E_0$ must be practically equal to $c_0$ because at that time the working voltage $e$ is extremely small and may be disregarded. If the magnitude of $c_0$ is so chosen as to cause all of the fundamental magnetization to be produced on the secondary, then the power factor of the machine will be almost unity, almost, because in order to take care of the primary reactance $c_0$ should be somewhat larger than necessary to produce the whole of the fundamental magnetization, thus compensating for the primary reactance. As the load increases $c_0$ should remain constant if the power factor is to remain nearly constant and the phase and magnitude of the auxiliary voltage E should increase with increasing e as shown in Fig. 4. Such an increase of E in each of the secondary phases 15 and 16 is brought about in Fig. 1 by the arrangement there shown, the voltages at the brushes 10, 11 and 12, 13 supplying the constant exciting components $c'$, $c''$ and the two adjustable ratio transformers supplying the variable working-voltage-opposing components $(-e')$ and $(-e'')$. It is to be noted that both components of $E'$ for 15 and of $E''$ for 16 are derived from the brushes co-operating with 9, the arrangement of transformers disclosed in Fig. 1 simply permitting of the magnitude of the components $(-e')$ and $(-e'')$ being changed without changing that of the components $c'$ and $c''$ and without displacing the brushes. Instead of changing the magnitude of the working voltage components automatically, the changes can be made by hand, quite an acceptable procedure, for instance, where the load changes at infrequent intervals.

The machine shown in Fig. 1 may be operated without the adjustable ratio transformers 17, 18 and 19, 20 and without the relay 22 and the co-operating series transformers, simply relying on the greater impedance of that secondary winding which carries the conduced exciting currents as against the other secondary winding which carries nothing but generated or induced working currents to sufficiently reduce the working ampereturns in the exciting winding. Very good results have thus been obtained in the case of some motors, working ampereturns in the exciting winding being practically eliminated at all loads.

If it be desired to free the exciting winding from all load ampereturns at some selected motor load only, for instance at that at which the motor usually operates, then the adjustable ratio transformers 17, 18 and 19, 20 can be set to cause their secondaries to produce voltages $(-e)$ equal and opposed to the working voltages e generated in the exciting winding at the slip corresponding to the selected load. At loads in excess of the selected load, positive working ampereturns will circulate in the exciting winding and at loads below that selected said windings will carry negative load ampereturns.

Figure 5:
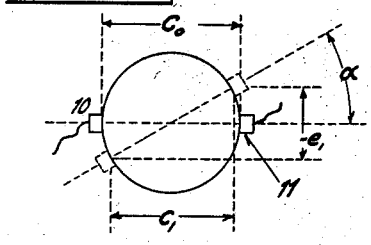

Exactly the same result can be achieved by discarding the adjustable ratio transformers and displacing the polyphase arrangement of brushes by a certain angle and in the proper direction and suitably redimensioning 15 and 16. Just what such a displacement will do is shown in Fig. 5 where the brushes 10, 11 have been displaced by the angle a. Whereas before the displacement the phase of the auxiliary voltage supplied by the brushes 10, 11 was of the phase required to produce the correct fundamental excitation of the machine and could not yield a working-voltage-opposing component, after the displacement the phase of the auxiliary voltage supplied by these same brushes is so changed that this voltage can be divided into components at right angles to each other, of which $c_1$ is of the proper phase to help excite the machine and $(-e_1)$ of the proper phase and direction to oppose the working voltage in the winding on which that particular auxiliary voltage is impressed. When the polyphase arrangement of brushes is displaced from the position shown in Fig. 1, and the adjustable ratio transformers are discarded, the brush voltage becomes the auxiliary voltage E and its components c and $(-e)$ are each smaller than the brush voltage. If the same commuted winding is used then 15 and 16 must be dimensioned to conform to the reduced values of c and $(-e)$.

In Fig. 1 the working-voltage-opposing component of the auxiliary voltages is derived from 9 with the help of brushes and transformers, the exciting voltage component can, of course, be derived in the same way and this may be of advantage where it is desired to vary the phase compensation in a manner differing from that to be secured by displacing the brushes.

Turning to Fig. 2, when the polyphase arrangement of brushes is in the position shown in that figure, the motor is adjusted to run light and the auxiliary voltages $E'$ and $E''$ supplied by the two sets of brushes 10, 11 and 12, 13 are of the proper phase to produce the whole or a part of the fundamental magnetization from the secondary. How much of this magnetization $E'$ and $E''$ produce merely depends on the magnitude of these voltages. In so far as the brushes 10, 11 are concerned, Fig. 6 indicates the existing conditions as to phase and magnitude, the vector OA representing the phase and magnitude of the auxiliary voltage $E'$. As the motor of Fig. 2 is loaded, the relay 22 moves the brush rocker arm 29 counter-clockwise and causes the brush 11 to successively occupy the positions indicated by the dotted brushes B and D in Fig. 6. After the brush rocker arm 29 has been displaced by $\alpha_1$ degrees, the vector OB indicates the magnitude and phase of the auxiliary voltage then prevailing at the brushes 10, 11. This auxiliary voltage now has a component c of proper phase for excitation and a component $(-e)$ of proper phase for opposing the working voltage induced in the secondary 15. After 29 has traveled through $\alpha_2$ degrees, OD is the vector which indicates the phase and magnitude of $E'$. The same diagram, if turned through 90 degrees, would indicate the corresponding conditions prevailing at the brushes 12, 13 and it is seen that with the arrangement indicated in Fig. 2 the auxiliary voltages impressed on the secondary exciting winding change their magnitude and phase with increasing load, but do not do so exactly in the manner prescribed by Fig. 4. If in Fig. 2 the excitation is set for unity power factor at no load and the brush rocker arm 29 moved counterclockwise with increasing load, the power factor of the machine will rise, the current leading, until the brush rocker arm 29 has been displaced through $\alpha_1$ degrees. Thereafter the power factor diminishes. When the displacement is $\alpha_2$ degrees, the power factor is again unity. The brush rocker arm can be so moved that the working voltages generated in 15 and 16 are equaled and opposed throughout the operating range of the motor. The no-load value of the auxiliary voltages can be set to produce a leading or lagging current component and need not necessarily be set for unity power factor. The travel of the brush rocker arm in a counterclockwise direction can, if desired, be limited by a suitably placed stop. If the brushes 10, 11 and 12, 13 of Fig. 2 are located at no load as shown in Fig. 1 and all the brushes are displaced by the means indicated in Fig. 2, then the changes in the exciting and in the working-current-opposing components of the auxiliary voltages impressed on the secondary exciting circuits can be followed or predetermined by means of the diagram of Fig. 5. In such case an increase of $(-e)$ is always accompanied by a decrease of $c$.

In Fig. 7 the primary is stationary and the secondary revolves, it rotates in the same direction as the fundamental magnetization of the machine whether the latter is produced from the primary or the secondary. The machine is started by connecting the primary 8', 8" to the supply, closing the secondary working winding 14 over the resistances 47 and reducing the latter to zero in one or more steps. The commutator brush circuits may be interrupted or not at starting as desired. If the motor is to start under a heavy load it is better to interrupt said brush circuits. The exciting winding 15, 16 is on the rotor and is a commuted winding. The auxiliary voltages are of line frequency, they are impressed on the commutator brushes, transformed by the revolving commutator into slip frequency voltages and utilized as such within the exciting winding. The auxiliary voltages are all derived from auxiliary adjustable windings located on the primary. The working voltages generated in the commuted winding at sub-synchronous speeds appear as line frequency voltages at the commutator brushes. The winding 48 supplies the exciting voltage $c'$ for the brush circuit 40, 41 and $c'$ leads the working voltage $e'$ at the brushes 40, 41 by about 90 degrees. The winding 49 supplies the working-voltage-opposing component $(-e')$ to the circuit of the brushes 40, 41. Similarly, the windings 51 and 50 supply the exciting and the working-voltage-opposing components for the circuit of the brushes 42, 43. Each component $c$ and $(-e)$ of each auxiliary voltage E can be adjusted by hand.

It is not always necessary to make use of the auxiliary windings 49 and 50 supplying the working voltage opposing components for the two auxiliary voltages E' and E", particularly when the primary and the two secondary windings occupy the relative positions in which they are shown in Fig. 8 and the impedance of 15, 16 per working volt generated in 15, 16 is greater than the impedance of 14 per working volt generated in 14 by the fundamental magnetization of the motor whether or not entirely produced by the winding 15, 16. This is one of the features of my invention which is applicable to any form of polyphase induction motor; to that shown in Figs. 1 and 2 wherein auxiliary voltages of slip frequency are generated or produced in the motor itself and then applied to the secondary exciting winding, as well as to that shown in Fig. 7 wherein auxiliary voltages of line frequency are produced in the motor itself, transformed into slip frequency voltages and utilized as such in the secondary exciting winding. It is also applicable to separately excited polyphase induction motors in which the auxiliary voltages whether of slip or line frequency are not produced in the motor itself but in a device independent of the motor.

Phase compensated non-synchronous motors can be used to simply draw a leading current component from the line. Synchronous motors have been used for this service under the name of synchronous condensers, these new machines can perform the same duty much more advantageously and when so used they can be described as asynchronous condensers. To this end they must be connected to the line and started in the usual way but considerably over-excited and preferably operated without load. Under such conditions a redistribution of material between secondary exciting and working windings will usually be desirable. Since asynchronous condensers would be required to either draw a constant leading current component or one which is only occasionally adjusted by an attendant, automatic regulation of $c$ or $(-e)$ will seldom be needed. Whether the auxiliary voltages are derived with the help of adjustable transformers or movable brushes it will be sufficient to either set the transformer ratio or the brush angle once for all and not interfere with this adjustment unless the magnitude of the leading current component is to be changed.

Synochronous condensers are usually connected to an alternating current system of distribution comprising a generator, a transmission line, a distributing network and a number of translating devices, some of which require a lagging current component. Some translating devices requiring such lagging current components are transformers of various types, induction and other alternating current motors. The synchronous condensers are usually located as close as possible to the translating devices which require lagging current components and adjusted to approximately compensate for the latter by drawing a corresponding leading component from the line. The synchronous condensers mostly require an unduly large current to start and are liable to hunt and even to fall out of step. It is my belief that a large capacity of synchronous machinery is in any case undesirable on any distribution system because of the excessive speed rigidity of such machines which tends to aggravate all tendencies to oscillations and requires instantaneous response to changes in load. The asynchronous condenser here described is entirely free from all these objections, it can be very readily started with a minimum current demand, it draws quite as large a leading current component, cannot possibly hunt or fall out of step and has no speed rigidity whatsoever. From all viewpoints, it is considerably superior to the synchronous type of condenser, by its use the power factor of a system can be corrected without endangering the system as a whole or adding to the operating difficulties.

In Fig. 9 I have diagrammatically illustrated a system embodying an asynchronous condenser. The three-phase synchronous generator 55, 56 delivers energy to the transformers 57 which feed the line 2, 3, 4. Induction motors 59 and 60 are connected to the line, the former through the transformers 58. The asynchronous condenser is 61, it comprises the primary 8, the secondary working winding 14, the secondary exciting winding 15 and the source 54 of the auxiliary voltages which cause the condenser to take leading current components from the line. These leading current components can be adjusted to compensate for the lagging current components taken by some or by all of the translating devices such as transformers or induction motors of the usual construction without phase compensation.

In principle it is immaterial whether it is the secondary or the primary which revolves, the mode of operation remains the same. Referring to Figs. 1 and 2, when the secondary is located on the rotor it revolves in the same direction as the fundamental magnetization of the motor. The commuted winding is then located on the stator and the brushes co-operating with same revolves with the secondary. In the case of Fig. 7, the primary may be located on the rotor in which case the commuted winding must be placed on the stator and the brushes must revolve with the primary.

To what extent the invention is taken advantage of when applied to a motor depends on the preference of the user. When load currents are practically eliminated from the exciting winding on the secondary the conditions are very favorable. The magnetic circuit of the motor should preferably have no polar projections and may be designed as is usual in asynchronous motor practice, but in dimensioning the circuits it should be remembered that under the most favorable conditions line connected primary windings in such a motor carry nothing but working currents, and not working and magnetizing currents as in the ordinary polyphase motor, and that the winding 14 on the secondary carries nothing but secondary load or working currents while the other winding 15, 16 on the secondary carries nothing but exciting currents. This last need only be dimensioned to take care of the exciting ampereturns which are small in such machines operating as motors, because of the small airgap. These ampereturns may remain constant at all motor loads and the commutator voltage may be chosen as low as desired.

Throughout this specification the term primary member is applied to that member which carries the windings connected to the supply, which windings carry the line working currents and whether or not these primary windings produce the revolving flux of the motor which flux always revolves synchronously with respect to the primary member. The other member is referred to as secondary whether or not it carries a winding or windings which produce all or a part of the revolving flux.

It is well known that any motor can be operated as a generator provided it be driven by a prime mover at a suitable speed, and it is also generally recognized that non-synchronous polyphase motors are no exception to this rule. It is further known that in the case of an asynchronous motor the voltages generated by the primary flux in any winding on the secondary change their direction when the machine passes from sub to super-synchronous speeds, thereby causing the machine to send working currents back to the line instead of drawing such currents from the supply. To keep the exciting circuits free from other than exciting currents is, of course, desirable whether the machine operates as a motor or as a generator. It is, therefore, to be understood that the terms used with reference to motor structures and operation are employed descriptively rather than limitatively.

While theories have been advanced in connection with the machines referred to herein, this has been done with a view to facilitating their description and understanding, but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

Having thus described the invention, what I claim is:

1. In an asynchronous polyphase motor, a primary, a secondary, a winding on the secondary in inductive relation to the primary and closed along at least one axis per pole pair, another winding on the secondary in inductive relation to the primary, the impedance per working volt of the second being greater than the impedance per working volt of the first winding on the secondary, and means for introducing auxiliary polyphase voltages into said second winding which lead the working voltages in that winding by about 90 degrees.

2. In an asynchronous polyphase motor, a primary, a secondary, a winding on the secondary in inductive relation to the primary and closed along a plurality of axes per pole pair, another winding on the secondary in inductive relation to the primary, the impedance per working volt of the second being greater than the impedance per working volt of the first winding on the secondary, means for introducing auxiliary polyphase voltages into said second winding which lead the working voltages in that winding by about 90 degrees, and means for varying the magnitude of the auxiliary voltages.

3. In an asynchronous polyphase motor, a primary, a secondary, a winding on the secondary in inductive relation to the primary and closed along a plurality of axes per pole pair, another winding on the secondary in inductive relation to the primary, the impedance per working volt of the second being greater than the impedance per working volt of the first winding on the secondary, means for introducing auxiliary polyphase voltages into said second winding which lead the working voltages in that winding by about 90 degrees, and means for varying the phase and the magnitude of the auxiliary voltages.

4. In an asynchronous polyphase motor, a primary, a secondary, a winding on the secondary in inductive relation to the primary and closed along a plurality of axes per pole pair, another winding on the secondary in inductive relation to the primary, the impedance per working volt of the second being greater than the impedance per working volt of the first winding on the secondary, means for introducing auxiliary polyphase voltages into said second winding which lead the working voltages in that winding by about 90 degrees, and means for changing the phase relation between the working and the auxiliary voltages.

5. In an asynchronous polyphase motor, a primary, a secondary, a winding on the secondary in inductive relation to the primary and closed along at least one axis per pole pair, another winding on the secondary in inductive relation to the primary, the impedance per working volt of the second being greater than the impedance per working volt of the first winding on the secondary, means for introducing auxiliary polyphase voltages into said second winding which lead the working voltages in the winding by about 90 degrees, and means for increasing the lead of the auxiliary over the working voltages as the motor load increases.

6. In an asynchronous polyphase motor, a primary, a secondary, a winding on the secondary in inductive relation to the primary and closed along at least one axis per pole pair, another winding on the secondary in inductive relation to the primary, the impedance per working volt of the second being greater than the impedance per working volt of the first winding on the secondary, means for introducing auxiliary polyphase voltages into said second winding which lead the working voltages in that winding by about 90 degrees, and means for increasing the lead of the auxiliary over the working voltages automatically as the motor load increases.

7. In an asynchronous polyphase motor, a primary, a secondary, a winding on the secondary in inductive relation to the primary and closed along at least one axis per pole pair, another winding on the secondary in inductive relative to the primary, the impedance per working volt of the second being greater than the impedance per working volt of the first winding on the secondary, means for introducing auxiliary polyphase voltages into said second winding which lead the working voltages in that winding by about 90 degrees, and means for increasing with increasing motor load the magnitude of the auxiliary voltages and their lead over the working voltages.

8. In an asynchronous polyphase motor, a primary, a secondary, a winding on the secondary in inductive relation to the primary and closed along a plurality of axes per pole pair, another winding on the secondary in inductive relation to the primary, the impedance per working volt of the second being greater than the impedance per working volt of the first winding on the secondary, and means for introducing auxiliary polyphase voltages into said second winding which lead the working voltages in that winding by more than 90 degrees.

9. In an asynchronous polyphase motor, a primary adapted for connection to a polyphase supply, a commuted winding on the primary, a secondary, a winding on the secondary closed along a plurality of axes per pole pair and in inductive relation to the primary, another polyphase winding on the secondary in inductive relation to the primary, the impedance per working volt of the second being greater than the impedance per working volt of the first winding on the secondary, and means for impressing on the second winding auxiliary polyphase voltages of slip frequency derived from the commuted winding and leading the working voltages in said second winding by about 90 degrees.

10. In an asynchronous polyphase motor, a primary adapted for connection to a polyphase supply, a commuted winding on the primary, a secondary, a winding on the secondary closed along a plurality of axes per pole pair and in inductive relation to the primary, another polyphase winding on the secondary in inductive relation to the primary, means for impressing on the other winding auxiliary polyphase voltages of slip frequency derived from the commuted winding and leading the working voltages in said other winding by about 90 degrees, and means for so changing the phase of the auxiliary polyphase voltages as to oppose the formation of working currents in the secondary winding on which said auxiliary voltages are impressed.

11. In an asynchronous polyphase motor, a primary adapted for connection to a polyphase supply, a commuted winding on the primary, a secondary, a winding on the secondary closed along a plurality of axes per pole pair and in inductive relation to the primary, another polyphase winding on the secondary in inductive relation to the primary, means for impressing on the other winding auxiliary polyphase voltages of slip frequency derived from the commuted winding and leading the working voltages in said other winding by about 90 degrees, and means for so changing the magnitude of the auxiliary polyphase voltages as to oppose the formation of working currents in the secondary winding on which said auxiliary voltages are impressed.

12. In an asynchronous polyphase motor, a primary adapted for connection to a polyphase supply, a commuted winding on the primary, a secondary, a winding on the secondary closed along a plurality of axes per pole pair and in inductive relation to the primary, another polyphase winding on the secondary in inductive relation to the primary, means for impressing on the other winding auxiliary polyphase voltages of slip frequency derived from the commuted winding and leading the working voltages in said other winding by about 90 degrees, and means for so changing the phase and magnitude of the auxiliary polyphase voltages as to oppose the formation of working currents in the secondary winding on which said auxiliary voltages are impressed.

13. In an asynchronous polyphase motor, a primary adapted for connection to a polyphase supply, a commuted winding on the primary, a secondary, a winding on the secondary closed along a plurality of axes per pole pair and in inductive relation to the primary, another polyphase winding on the secondary in inductive relation to the primary, means for impressing on the other winding auxiliary polyphase voltages of slip frequency derived from the commuted winding and leading the working voltages in said other winding by about 90 degrees, and means dependent on variations of the load on the motor for automatically so changing the phase of the auxiliary polyphase voltages as to oppose the formation of working currents in the secondary winding on which said auxiliary windings are impressed.

14. In an asynchronous polyphase motor, a primary, a secondary, a polyphase and another winding on the secondary, the polyphase winding being in closer inductive relation to the primary than the other winding and having a lower ohmic resistance, and means for introducing auxiliary polyphase voltages into the secondary winding having the higher ohmic resistance said auxiliary voltages leading the generated working voltages in the winding with the higher ohmic resistance by about 90 degrees.

15. In an asynchronous polyphase motor, a primary adapted for connection to the supply, a secondary, a working and an exciting winding on the secondary in inductive relation to the primary, the working winding being closed along a plurality of axes per pole pair and located between the primary and the exciting winding, and means for introducing auxiliary polyphase voltages into the exciting winding said auxiliary voltages leading the working voltages generated in the exciting winding by about 90 degrees.

16. In an asynchronous polyphase motor, a primary adapted for connection to the supply, a secondary, a working and an exciting winding on the secondary in inductive relation to the primary, the working winding being closed along a plurality of axes per pole pair and located between the primary and the exciting winding, the impedance per working volt of the exciting winding being higher than the impedance per working volt of the working winding, and means for introducing auxiliary polyphase voltages into the exciting winding said auxiliary voltages leading the working voltages generated in the exciting winding by about 90 degrees.

17. In an asynchronous polyphase motor, a primary, a secondary, a winding on the secondary in inductive relation to the primary and closed along a plurality of axes per pole pair, another winding on the secondary in inductive relation to the primary, the impedance per working volt of the second being greater than the impedance per working volt of the first winding on the secondary, means for introducing auxiliary polyphase voltages into said second winding, said auxiliary voltages having one component leading the working voltages in that winding by about 90 and another leading them by about 180 degrees, and means for varying the magnitude of one of these components.

18. In an asynchronous polyphase motor, a primary, a secondary, a winding on the secondary in inductive relation to the primary and closed along a plurality of axes per pole pair, another winding on the secondary in inductive relation to the primary, the impedance per working volt of the second being greater than the impedance per working volt of the first winding on the secondary, means for introducing auxiliary polyphase voltages into said second winding, said auxiliary voltages having one component leading the working voltages in that winding by about 90 and another leading them by about 180 degrees, and means for varying the magnitude of one of these components without varying the magnitude of the other.

19. In an asynchronous polyphase motor, a primary, a secondary, a winding on the secondary in inductive relation to the primary and closed along a plurality of axes per pole pair, another winding on the secondary in inductive relation to the primary, the impedance per working volt of the second being greater than the impedance per working volt of the first winding on the secondary, means for introducing auxiliary polyphase voltages into said second winding, said auxiliary voltages having one component leading the working voltages in that winding by about 90 and another leading them about 180 degrees, and means including adjustable ratio transformers for varying the magnitude of one of these components.

20. In an asynchronous polyphase motor, a primary, a secondary, a winding on the secondary in inductive relation to the primary and closed along a plurality of axes per pole pair, another winding on the secondary in inductive relation to the primary, the impedance per working volt of the second being greater than the impedance per working volt of the first winding on the secondary, means for introducing auxiliary polyphase voltages into said second winding, said auxiliary voltages having one component leading the working voltages in that winding by about 90 and another leading them by about 180 degrees, and an inductive connection between the source of at least one component of the auxiliary voltages and the second winding on the secondary.

21. The method of operating an asynchronous polyphase motor the torque of which depends on a flux moving synchronously with respect to the primary, comprising, generating polyphase working voltages in independent secondary circuits, allowing the free formation of working or torque producing currents in one of the secondary circuits, restricting the formation of working currents in the other secondary circuit, and introducing into said other secondary circuit auxiliary polyphase voltages to produce at least part of the synchronously moving flux.

22. The method of operating an asynchronous polyphase motor the torque of which depends on a flux moving synchronously with respect to the primary, comprising, generating polyphase working voltages of slip frequency in independent secondary circuits, allowing the free formation of working or torque producing currents in one of the secondary circuits, producing on the primary auxiliary polyphase voltages of slip frequency, and impressing these auxiliary voltages on the other secondary circuit to produce at least part of the synchronously moving flux.

23. The method of operating an asynchronous polyphase motor the torque of which depends on a flux moving synchronously with respect to the primary, comprising, generating polyphase working voltages of slip frequency in independent secondary circuits, allowing the free formation of working or torque producing currents in one of the secondary circuits, producing on the primary auxiliary polyphase voltages of slip frequency, and impressing these auxiliary voltages on the other secondary circuit to produce at least part of the synchronously moving flux and to oppose the working voltages generated in said other secondary circuit.

24. In an asynchronous polyphase motor, a primary, a secondary, a winding on the secondary in inductive relation to the primary and closed along at least one axis per pole pair, another winding on the secondary in inductive relation to the primary, the impedance of the circuit comprising the second winding per working volt generated in said second winding being greater than the impedance of the circuit comprising the first winding per working volt generated in said first winding, and means for introducing auxiliary polyphase voltages into said second winding which lead the working voltages in that winding by about 90 degrees.

25. In an asynchronous polyphase motor, a primary, a secondary, polyphase working and exciting circuits on the secondary in inductive relation to the primary, means comprising one of said secondary polyphase circuits for producing at least part of the revolving field of the motor, and impedances in the polyphase exciting circuits to raise the total impedance of these circuits per working volt generated therein above the total impedance of the secondary working circuits per working volt generated in said secondary working circuits.

In testimony whereof I affix my signature this 11th day of December, 1924.

VALÈRE ALFRED FYNN.